(12) United States Patent
Brundisini et al.

(10) Patent No.: US 8,145,360 B2
(45) Date of Patent: Mar. 27, 2012

(54) SYSTEM FOR THE REMOTE CONTROL OF CONTROL UNITS, EVEN BATTERY POWERED CONTROL UNITS, FOR IRRIGATION DEVICES

(75) Inventors: Andrea Brundisini, Pordenone (IT); Franco Milan, Caneva (IT)

(73) Assignee: Claber S.p.A., Fiume Vento (PN) (IT)

( * ) Notice: Subject to any disclaimer, the term of this patent is extended or adjusted under 35 U.S.C. 154(b) by 246 days.

(21) Appl. No.: 12/452,792

(22) PCT Filed: Jul. 18, 2008

(86) PCT No.: PCT/EP2008/059442
§ 371 (c)(1),
(2), (4) Date: Jan. 22, 2010

(87) PCT Pub. No.: WO2009/013234
PCT Pub. Date: Jan. 29, 2009

(65) Prior Publication Data
US 2010/0130188 A1    May 27, 2010

(30) Foreign Application Priority Data
Jul. 23, 2007 (IT) .............. MI2007A1475

(51) Int. Cl.
*G05D 11/00* (2006.01)
*G06F 15/16* (2006.01)
*H04M 3/00* (2006.01)
*H04M 11/00* (2006.01)

(52) U.S. Cl. .... 700/284; 455/420; 709/219; 379/106.01
(58) Field of Classification Search ............ 700/284; 709/219; 455/420; 379/106.01
See application file for complete search history.

(56) References Cited

U.S. PATENT DOCUMENTS

| | | |
|---|---|---|
| 2003/0093159 A1 | 5/2003 | Sieminski |
| 2003/0120357 A1 | 6/2003 | Battistutto et al. |
| 2004/0236443 A1 | 11/2004 | Ware et al. |
| 2005/0090936 A1* | 4/2005 | Hitt et al. ............ 700/284 |
| 2006/0043208 A1 | 3/2006 | Graham |

OTHER PUBLICATIONS

International Search Report dated Oct. 27, 2008.

* cited by examiner

*Primary Examiner* — Sean Shechtman
(74) *Attorney, Agent, or Firm* — Jacobson Holman PLLC

(57) ABSTRACT

A system for the remote control of a plurality of control units (A11 . . . A1*n* . . . An1 . . . Ann) for irrigation devices is described; the system includes a data processing device (1, B1 . . . Bn) for setting data regarding the duration and frequency of the irrigation periods of the irrigation devices associated to the control units and their position in time. The data processing device (1, B1 . . . Bn) includes a database (11) with archives containing the list of the control units of the plurality and data regarding their operation.

15 Claims, 1 Drawing Sheet

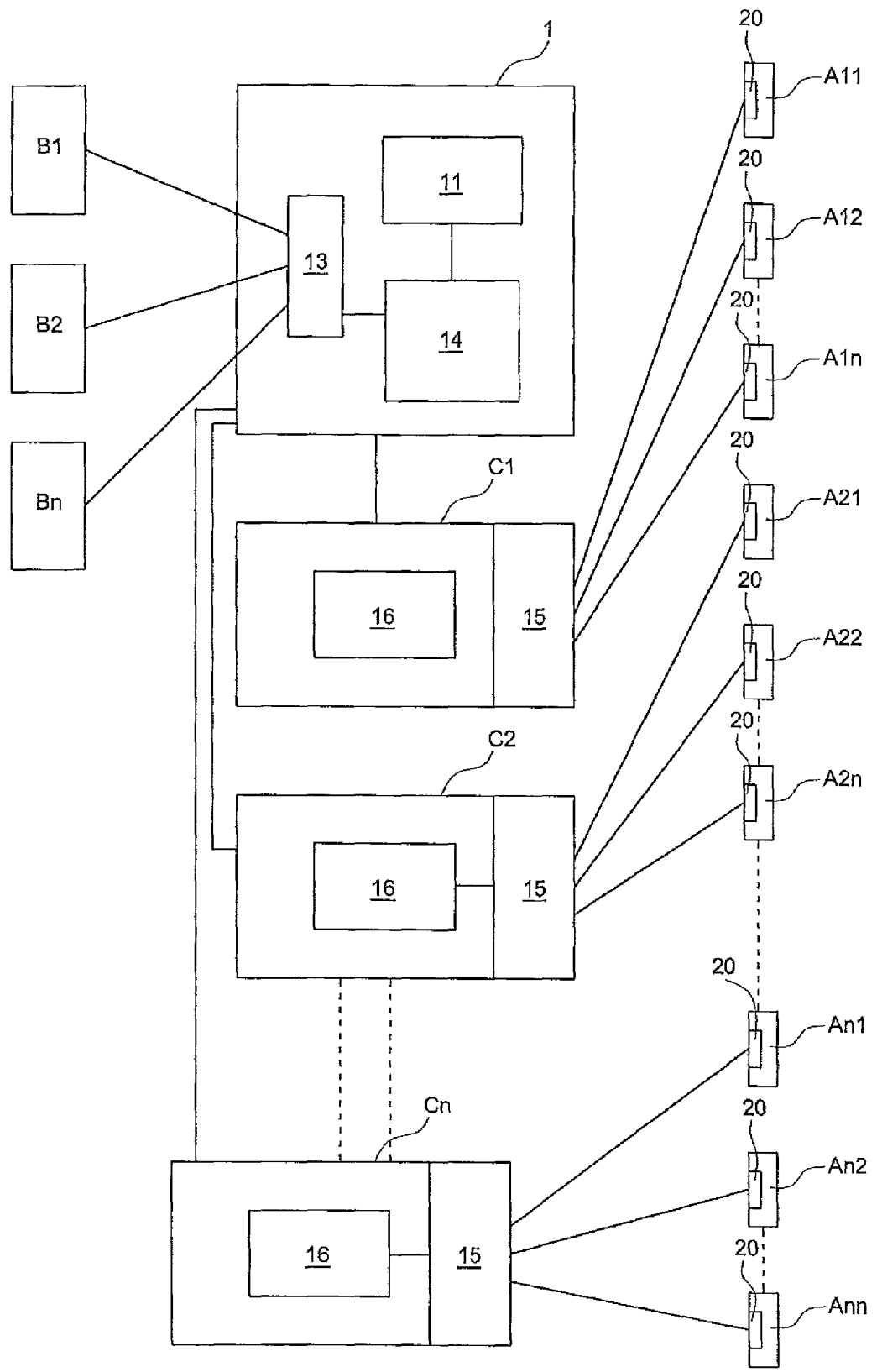

SYSTEM FOR THE REMOTE CONTROL OF CONTROL UNITS, EVEN BATTERY POWERED CONTROL UNITS, FOR IRRIGATION DEVICES

This is a national stage of PCT/EP08/059442 filed Jul. 18, 2008 and published in English, which has a priority of Italian no. MI 2007A 001475 filed Jul. 23, 2007, hereby incorporated by reference.

The present invention relates to a system for the remote control of control units, even battery powered control units, for irrigation devices.

The control of irrigation devices by means of control units placed at positions which are easily accessible from the irrigation area is known in the state of the art. The control units may be programmed by a user to set the irrigation time periods on various days of the month and during each month of the year. The setting of the irrigation time periods may be modified depending on the environmental conditions or on other events.

Each sector in the field of irrigation has its own requirements and those who produce automatic irrigation systems have great difficulty in meeting all of them together. Even within the same irrigation sector, as could be the maintenance of public parks and gardens, sport grounds, farm lands, gardening, nursery, floriculture facilities and so on, the requirements of the single users vary depending on their practices, on their own experience and on the environmental conditions.

In view of the state of the art, the object of the present invention is to provide a system for the remote control of control units for irrigation devices, which may be adapted to different irrigation sectors, is flexible and specifically allows to use mobile telephone networks even when, as often occurs, the site where the control unit stands is not provided with electric power and the use of batteries is the only alternative.

According to the present invention, such an object is achieved by means of a system for the remote control of a plurality of control units for irrigation devices, said system including a data processing device for setting the data regarding the duration and frequency of the irrigation time periods of the irrigation devices associated to the control units and their position in time, said processing device including a database with archives containing the list of the control units of said plurality and data regarding their operation, and control means for the control units allowing to send a command regarding the duration of the irrigation time periods to the control units and their position in time in reply to the data set in said processing device, said control means including at least one module provided with a telephone interface for sending said set data to the control units of said plurality of control units, characterised in that each control unit of said plurality of control units includes a telephone interface for receiving the data deriving from said at least one module, each telephone interface of the control units being active in a time window having a limited duration and each time window having a different time position with respect to the time window of another control unit of the plurality of control units, said at least one module being adapted to send said set data to each control unit of said plurality of control units only during said activation time window for the telephone interface of the control unit.

It should be noted that in the case of battery powered control units, the remote control system for the control units according to the invention solves the problem of the battery charge conservation by using each control unit for a limited time period.

The features of the present invention will become more apparent from the following description of a practical embodiment thereof, shown by way of non-limitative example in the accompanying FIG. 1 which is a diagram of a system for the remote control of control units for irrigation devices according to the present invention.

FIG. 1 shows a diagram of the system for the remote control of control units A11 ... A1$n$ ... An1 ... Ann for irrigation devices according to the present invention. Each control unit A11 ... A1$n$ ... An1 ... Ann is preferably battery powered and therefore has a power supply limited in time. The system includes a web server 1 which is accessible by a plurality of external remote terminals B1 ... Bn; specifically, the duration and the position in time of the irrigation time periods of the single control units may be set by means of said external terminals. The web server 1 includes a memory provided with a database 11 with archives containing the list of the control units and the data regarding their operation, i.e. the data for programming the irrigations, the state of the control units, etc. ... The web server 1 includes an interface 13 for the remote connection with the external remote terminals B1 ... Bn and a unit 14 with a data processor, memory and application software for the control of the interface 13 and of the database 11. The unit 14 receives the data sent by the external remote terminals B1 ... Bn, substantially the data for setting the irrigation periods for the control units A11 ... A1$n$ ... An1 ... Ann, and processes the data received to update the archives of the database.

The system further includes control means of the control units which allow to send commands regarding the duration of the irrigation time periods and their position in time to the control units A11 ... A1$n$ ... Ann in reply to the data received from said external remote terminals.

The control means for the control units include at least one module C1 ... Cn, although a plurality of modules C1 ... Cn is preferable, a respective plurality of control units A11 ... A1$n$, A21 ... A2$n$, ... An1 ... Ann corresponding to each of the modules C1 ... Cn of the plurality of modules C1 ... Cn; each module C1 ... Cn includes a telephone interface 15, preferably a satellite interface for instance of the GSM or GPRS type, for the exchange of data with the control units.

Each control unit A11 ... A1$n$ ... An1 ... Ann includes a telephone interface 20, preferably a satellite interface for instance of the GSM or GPRS type, for receiving data from the web server by means of one of the modules C1 ... Cn; said interface 20 is activated only during time windows T1 ... Tn, which are synchronised with the respective time windows for the activation of the interface 15 of the modules C1 ... Cn, having a limited duration for the exchange of data with the modules C1 ... Cn. The single modules C1 ... Cn are adapted to send data to each control unit of the respective plurality of control units associated to each of them in reply to the data received from the web server 1 and deriving from the external remote terminals only during said time window for the activation of the reception means of the control unit. More specifically, the interface 20 of each control unit of the plurality A11 ... A1$n$ is activated during time windows T1 ... Tn, normally having equivalent duration although in different time positions, for receiving the data from the module C1; the interface 20 of each control unit of the plurality A21 ... A2$n$ is activated during time windows T1 ... Tn, normally having the same duration although in different time positions for receiving data from the module C2 and so on.

Said time windows T1 ... Tn have a duration of about five minutes.

The unit 14 of the web server 1 serves to select the various modules C1 ... Cn, to which the pluralities of control units A11 ... A1n ... An1 ... Ann are associated, and to address to each module C1 ... Cn only the signals related to the irrigation time periods regarding the plurality of control units associated to the single module C1 ... Cn.

The external remote terminals may be part of the personal computers connected on the Internet with the web server 1; a dedicated software for the personal computer allows the user to interact with the web server to obtain the state of the control unit at issue and program or modify the duration of the irrigation time periods and their position in time.

The external remote terminals may also consist of mobile telephones or PDAs (Personal Digital Assistant) by means of a GSM or GPRS network with the web server by means of text messages.

One or more modules may also be integral with the web server 1.

The devices C1 ... Cn may also be computers each provided with a telephone interface 15, preferably a satellite interface for instance of the GSM or GPRS type, for the exchange of data with the control units; each interface or modem 15 may control at most a number of 120 control units by interacting with them during time periods having the same duration of five minutes within a time range between 2:00 pm and 0:00 am. In this case, each module C1 ... Cn includes a data processor 16 with a memory and a Scheduler application software for the control of the interface 15, of the data received from the web server 1. In this case the modules C1 ... Cn are normally connected with the web server 1 on the Internet with an encrypted network of the VPN type (Virtual Private Network) and each of them includes an interface for receiving the data from the web server 1; each of the modules C1 ... Cn is normally arranged in a remote position with respect to the web server 1.

It may also occur that one or more modules C1 ... Cn are connected to the web server 1 by means of a satellite network.

As an alternative, the system for the remote control of control units A11 ... A1n ... An1 ... Ann for irrigation devices according to the present invention may include a single computer for setting the data regarding the duration and frequency of the irrigation periods of the irrigation devices associated to the control units and their position in time, instead of the web server 1 and the external remote terminals B1 ... Bn. A module C1 ... Cn is connected to the single computer and the computer includes the database 11 and the unit 14 with data processor, memory and application software for the control of the database 11.

The interfaces 15 and 20 may also be of the UMTS type or of the VOIP type.

The invention claimed is:

1. A system for the remote control of a plurality of control units for irrigation devices, said system including a data processing device for setting data regarding the duration and frequency of irrigation time periods of the irrigation devices associated with the control units and the position in time of the irrigation time periods, said processing device including a database with archives containing a list of the control units of said plurality and data regarding the operation of the control units, and control means for the control units allowing to send a command regarding the duration of the irrigation time periods to the control units and the position in time of the irrigation time periods in reply to the data set in said data processing device, said control means including at least one module provided with a telephone interface for sending said set data to the control units of said plurality of control units, each control unit of said plurality of control units including a telephone interface for receiving the data deriving from said at least one module, wherein each telephone interface of the control units is configured to be active in a time window having a limited duration and each time window having a different position in time as compared to the time window of another control unit of the plurality of control units, said at least one module being adapted to send said set data to each control unit of said plurality of control units only during said activation time window for the telephone interface of the control unit, each time window being synchronised with a respective time window for the activation of the telephone interface of the at least one module.

2. The system according to claim 1, wherein said data processing device includes a web server which is accessible by at least one external remote terminal for setting the data regarding the duration and frequency of the irrigation periods of the irrigation devices associated to the control units and the position in time of the irrigation time periods, said control means for the control units allowing to send a command regarding the duration of the irrigation time periods and the position in time of the irrigation time periods to the control units in reply to the data set by said at least one external remote terminal.

3. The system according to claim 2, wherein said at least one module includes a plurality of modules each of which is associated to a plurality of control units.

4. The system according to claim 3, wherein at least one of said modules is connected to the web server by means of a Virtual Private Network Internet network, said web server being adapted to send only the data set on the control units associated to each module to said at least one module.

5. The system according to claim 3, wherein at least one of said modules is connected to the web server by means of a satellite network, said web server being adapted to send only the data set on the control units associated to each module to said at least one module.

6. The system according to claim 2, wherein said at least one external remote terminal is a personal computer adapted to exchange data with said web server by means of an Internet network.

7. The system according to claim 1, wherein said at least one module includes a data processor and a memory on which an application software is installed and runs.

8. The system according to claim 2, wherein said at least one module is integral with the web server.

9. The system according to claim 2, wherein said at least one external remote terminal is a mobile telephone adapted to exchange data with said web server by means of a GSM network.

10. The system according to claim 2, wherein said web server includes an interface for the remote connection with said at least one external terminal and a unit with a data processor, a memory and an application software for the control of the database and of the interface.

11. The system according to claim 1, wherein at least one control unit of said plurality of control units is battery powered.

12. The system according to claim 1, wherein each control unit of said plurality of control units is battery powered.

13. The system according to claim 1, wherein said telephone interface of said at least one module and the telephone interface of each control unit of said plurality of control units are of the satellite type.

14. The system according to claim 13, wherein said satellite interface of said at least one module and the satellite interface of each control unit of said plurality of control units are of the GSM type.

15. The system according to claim 13, wherein said satellite interface of said at least one module and the satellite interface of each control unit of said plurality of control units are of the GPRS type.

\* \* \* \* \*